United States Patent
Levy

(10) Patent No.: US 7,340,465 B2
(45) Date of Patent: Mar. 4, 2008

(54) ACTIVE MESSAGING SYSTEM AND METHOD

(75) Inventor: David Henry Levy, Cambridge, MA (US)

(73) Assignee: TH, Inc., Arlington, MA (US)

( * ) Notice: Subject to any disclaimer, the term of this patent is extended or adjusted under 35 U.S.C. 154(b) by 274 days.

(21) Appl. No.: 10/053,264

(22) Filed: Jan. 23, 2002

(65) Prior Publication Data

US 2004/0039731 A1    Feb. 26, 2004

Related U.S. Application Data

(60) Provisional application No. 60/255,952, filed on Dec. 18, 2000.

(51) Int. Cl.
*G06F 17/30*    (2006.01)

(52) U.S. Cl. ............ 707/10; 707/3; 707/4; 707/7; 707/102

(58) Field of Classification Search .......... 707/3, 707/7, 4, 102, 2, 10, 706, 206, 531, 104.1; 709/217, 229, 203, 206, 245, 246
See application file for complete search history.

(56) References Cited

U.S. PATENT DOCUMENTS 6,014,711 A * 1/2000 Brown .................. 709/245
6,185,551 B1 * 2/2001 Birrell et al. ............. 707/3
6,360,221 B1 * 3/2002 Gough et al. ............ 707/10

OTHER PUBLICATIONS

Gordon Padwick and Helen Feddema, Special Edition Using Microsoft Oytlook 2000, Que, Specisl edition, chapters 3 and 30. Pub date: May 12, 1999.*

* cited by examiner

*Primary Examiner*—Alford Kindred
*Assistant Examiner*—Belix M Ortiz
(74) *Attorney, Agent, or Firm*—Fish & Richardson P.C.

(57) ABSTRACT

As a user is drafting an electronic document (e.g., a word processing document, spreadsheet, etc.), the user may enter a predefined string of characters that represents a placeholder for information which is to be inserted into the document. A computerized system recognizes the predefined string of characters and, in response, automatically opens a messaging window that permits the user to request the information from one or more recipients. The message may include a portion of the electronic document surrounding the predefined string of characters to provide context for the recipients. A recipient can edit the context provided in the message to provide the requested information and transmit the message back to the user. If the user approves the edit made by the recipient, the computerized system may be configured to automatically integrate the edit into the electronic document.

20 Claims, 2 Drawing Sheets

ACTIVE MESSAGING SYSTEM AND METHOD

This application incorporates as reference provisional application 60/255,952, filed Dec. 18, 2000.

FIELD OF THE INVENTION

This invention relates generally to knowledge management and messaging systems and more particularly means to integrate information acquisition with document creation.

BACKGROUND OF THE INVENTION

Written communication is currently viewed as an independent task, but the truth is communication itself is almost never the goal. That is to say communication (for communication's sake) is rarely, if ever, the object of the communication, especially in business. Rather, the goal of business, and even work in general, is to produce documentation, calculations, estimations, drawings, data, presentations, and the like. And likewise, the primary purpose for communication is to collect information so that the documentation, calculations, estimations, drawings, data, and presentations may be created. However, communication and work are distinctly different unrelated activities. And, like messaging, knowledge management is an activity largely dissociated from the work being performed.

Under the existing work paradigm, a person will be in the process of performing a task when they realize they need information they do not have. At that point they may access their email program, and write an email message to ask a colleague to supply the missing information. When the response arrives, perhaps a day or two later, the person reads the response. Next they then locate the original file, open it, find the appropriate location within the file and then incorporate the new information. The tasks that comprise "work" are performed in isolation from the subtask of gathering information that makes the work possible. This is inefficient.

The instant invention is an active messaging and knowledge management system built on these observations, the object of which is to provide a variety of means to integrate the objectives of communication with the act of communication.

It is therefore desirable to provide a system with the following advantages: 1) To allow users to save time by allowing the creator of a document to integrate the process of collecting information with the process of incorporating that information in the development of that document. 2) To reduce errors in document creation by (i) reducing the number of steps required to complete the task in which human error would produce a copying-related error. (ii) allowing the respondent to view directly the context of the matter at issue without requiring additional steps on behalf of the questioner (iii) allowing the person with the respondent to directly manipulate the final result, allowing him to instill nuance and subtlety that would otherwise be lost or simply never expressed 3) To provide a collaborative data flow while maintaining full control of the document by its "owner" (author) so that nothing in the document is altered outside the control of the author and 4) To create a documented chain of information flow during the creation of a document. Specifically, to provide a record of which questions were asked, which respondents answered them, which respondents did not answer them, at what time knowledge transfer occurred and with whose knowledge information flowed, and most importantly, who provided the information that ended up in the document, 5) To provides access to unknown information desired by a user in the context of creating a document in a logical, efficient, unified manner and 6) To provide a method for a "to do" list of one's own information gathering objectives to become effective agents, actually completing the tasks, rather than taking notes.

SUMMARY OF THE INVENTION

The system and method of the instant invention includes messaging software and algorithms designed to operate closely with existing software packages. In one embodiment, the invention includes at least one predefined character string, preferably fanciful, (such as "MJIK") that is used as a place holder to identify the location of missing information (i.e. some as-yet unknown data that the user requires in order to continue his work on the document). Another embodiment includes a messaging system with two distinct messaging components that work together to both communicate and complete tasks associated with the communication. There are two primary branches of the invention: a branch intended for response by a person and a branch intended for machine response.

The way it works is simple. A predefined character set (such as MJIK) is used as a universal variable. The user may enter the variable anywhere in a file to identify each location where more knowledge is needed. This variable can represent a single piece of data, or unknowns within a greater context. The response to the message is the data that will be used to replace the MJIK variables, and (if necessary) the context around the variables.

MJIK software integrates work tasks with the communication that makes the work happen. When a person is performing a task and they realize they need information . . . they send a MJIK message. When the answer returns, it includes a window displaying the response incorporated into the context of the original document. If the result looks correct, the MJIK software will automatically update the original document to reflect the edited response.

This concept expands to the collection and implementation of all information. A MJIK message can be sent to (and get response from) a person, a web agent, a database, or data mining engine.

Operation

A person may be working in an existing software package such as: Microsoft Word, Excel, Oracle, or their contact list, while they are writing a company report, making a revenue estimation, entering data or wondering what someone's home phone number is. When the user arrives at a point when they need information they don't have, he simply types the pre-defined unique character set (such as "MJIK[1]") into the location where the information belongs. This acts as an information variable. The proposed software will recognize this entry (at any location, in any program) as the need for information, and will automatically open a MJIK communication window.

The window will have two areas: a message area and a context area, (as shown in FIG. 2). The context area will automatically display a default level of context, a few sentences (or a reduced spreadsheet, a portion of a drawing, etc.) focused around the location where the user typed the system's call letters: "MJIK." The user may click to increase or decrease the amount of context provided. If appropriate, the user can enter a message into the message area, explaining the question. (For simple data retrieval, the context is often enough for the system to update automatically. Examples are given below.)

If the recipient is human:

The recipient may respond in a variety of ways. Perhaps they have the answer. Perhaps they have an opinion, but cannot answer the question. Perhaps they know nothing. They respond accordingly by responding to the question, redlining the context itself, or both.

When the sender receives the response they are presented with: a response to the message, variables replaced by answers, edited context, or all the above. The sender then reviews the response. If it looks correct, he can have the system update the original document with the context as it was edited in the MJIK messaging window. This process is outlined in FIG. 1.

If the recipient is NOT human:

There are two classes of non-human recipient. The first is a traditional database. This may include phone numbers, zip codes, area codes, stock quotes, invoice numbers, company projections, jokes, historical data, etc. The second is the input to a data mining system. This system would include all of the corporate voice and text communication. This would be an extremely powerful tool. (It will also require tremendous amounts of computation and storage, but as we know . . . we can expect to have tremendous amounts of competition and storage available . . . especially if the customer wants to buy it from Compaq.) This functionality is seen as a next-next generation active messaging system.

In summary, the tasks that comprise "work" are performed in isolation from the subtask of gathering information that makes the work possible. This is a fundamental disconnection that offers tremendous opportunity that suggests large amounts of work to enable the next-generation of work paradigm. MJIK messages are empowered to implement the result of the query that was sent. (Note: the system of the instant invention is sometimes referred to as "MJIK" in this application) In the preferred embodiment, the MJIK system consists of messaging software designed to operate with other software packages, instead of independently from them. MJIK messages may be generated from within any software package. Outgoing MJIK messages show the recipient the context of the question . . . and the reply shows the answer in context. The sender can then review or edit the reply and by pressing the "accept" button, the MJIK software completes the cycle by implementing the response. Therefore, the user only needs to do the work once. MJIK streamlines business by integrating communication with the work being done.

This is different from the normal operating procedure today, in which a person will be performing a task when they realize they need information they do not have. At that point they may access their email program, and write an Email to ask someone the missing information. When the response arrives, the person reads the incoming message. Next they locate the original file, open it, find the appropriate location within the file and then perform the task of incorporating the new information into the old.

The system therefore has the following advantages: 1) It saves time by allowing the creator of a document to integrate the process of collecting needed information with the process of incorporating that information. The creator is saved the steps of finding the original document, locating the correct location within it and then resolving the two texts into one. 2) It reduces errors by (i) reducing the number of steps required to complete the task in which human error would produce a copy error. (ii) allowing the person with additional information to directly view the context of the matter at issue (iii) allowing the person with the additional information to directly manipulate the final result, allowing him to instill nuance and subtlety that would otherwise be lost or simply never expressed 3) It maintains data flow through the owner of the document so that nothing in the document is altered outside the control of the author, and 4) It creates a documented chain of information flow. Specifically, the system provides a record of which questions were asked, who answered them, who did not answer them, at what time and with whose knowledge information flowed, AND most importantly, who provided the information that ended up in the document, 5) It provides access to information in a logical, efficient, unified manner and 6) It provides a way for a "to do" list of one's own information gathering objectives to become effective agents, actually completing the tasks, rather than taking notes.

DETAILED DESCRIPTION OF THE FIGURES

Figure 1:
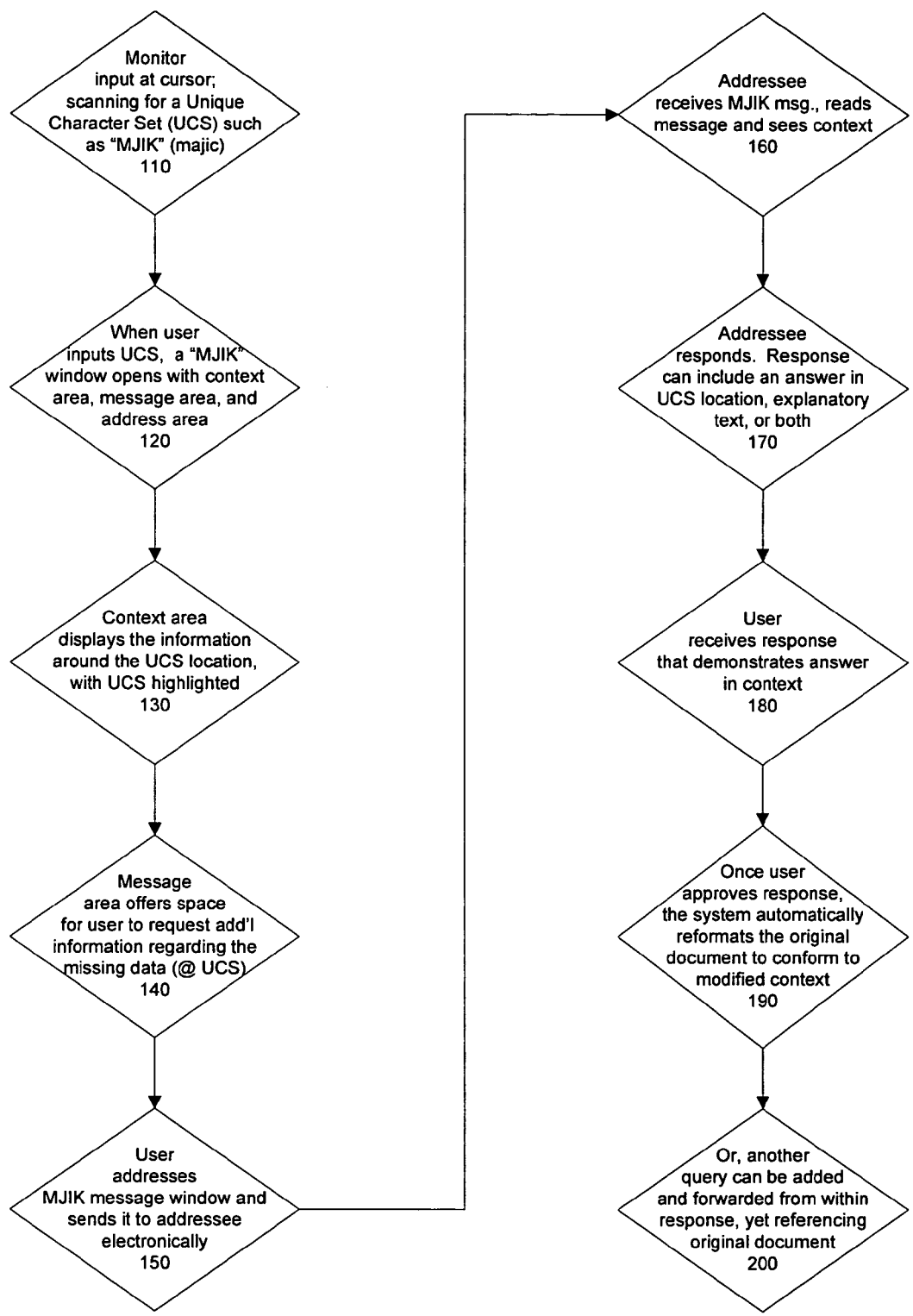
FIG. 1 shows a flow chart of an embodiment of the instant invention that interacts with a human respondent (addressee).

FIG. 1 shows a flow chart of an embodiment of the instant invention that interacts with a human respondent (addressee). In Step 110 the system monitors the input has received at the cursor location, scanning for a unique character set (UCS) that has otherwise no meaning to the system, or in the language, such as the letters MJIK. In step 120 the system identifies the user's input of the desired UCS, and in response opens the messaging window 5. In the preferred embodiment (for human interaction) this messaging window 5 includes a query message window 10, a context area 14 and an address area 32. In step 130 the system automatically extracts information associated with the location where the MJIK variable is located and places this information into context area 14. In the case of a text document, this context information may simply be the paragraph it contains. In the case of a spreadsheet document, it may contain the cells the far left in above the location of the MJIK variable. The UCS itself may be highlighted to accentuate its location. In step 140, sender (user) may ask questions or provide commentary in query message window 10. As shown in FIG. 2, this step may include graphical information may extend into context area of 14. In step 150 the user provides an address to where the MJIK message will be sent. In step 160, the addressee receives the MJIK message. Upon opening the message they can simultaneously read the information entered in steps 130 and 140. In step 170 the addressee responds to the message. In one embodiment the response includes manipulation of the information in context area 14. In the preferred embodiment, the response includes replacement of the MJIK variable with information known to the addressee. In either case, the addressee may respond with additional information in query message window 10. One embodiment includes a new query message window 10, dedicated to the response. This message is then returned to the sender. In one embodiment of step 180, the sender receives the response with the MJIK variable simply replaced with the missing information, as understood by the addressee. In another embodiment of step 180, the sender receives the response demonstrating how the addressee would modify the original text, in response to the information in the query message window 10. Such a response would include replacement of MJIK variable with information known to address the, but also may include peripheral changes to the information in the context area 14. In step 190, the sender views the information provided by the recipient in both windows and may accept the modifications provided by the recipient in the context window without additional modification, or may modify the information provided by the recipient before accepting the information. The result is that the sender may learn information from another person through a written means and incorporate that new information into an existing document with the only additional effort being reading and approving the change. In another embodiment, the sender may incorporate this new information with changes they make, but still without requiring the sender to find or open the document. Moreover, the addressee may receive this information remotely, such as a handheld computing device, and the sender may likewise be at remote location when he provides acceptance of the changes. This is to say that the center may read the necessary information, the MJIK variable or context change, via the return message routed through their cellular telephone. In this embodiment, step 190 includes modification to an original document located at significant distance from the sender at the time the original document is modified. In step 200, the sender has additional questions to be posed to the regional addressee, or potentially a third party. In either case, the chain of information is established such that all changes are ultimately referenced to the original document so that when the sender accepts the final changes, regardless of how many iterations of changes have occurred, the final changes occur in the original document.

Figure 2A:
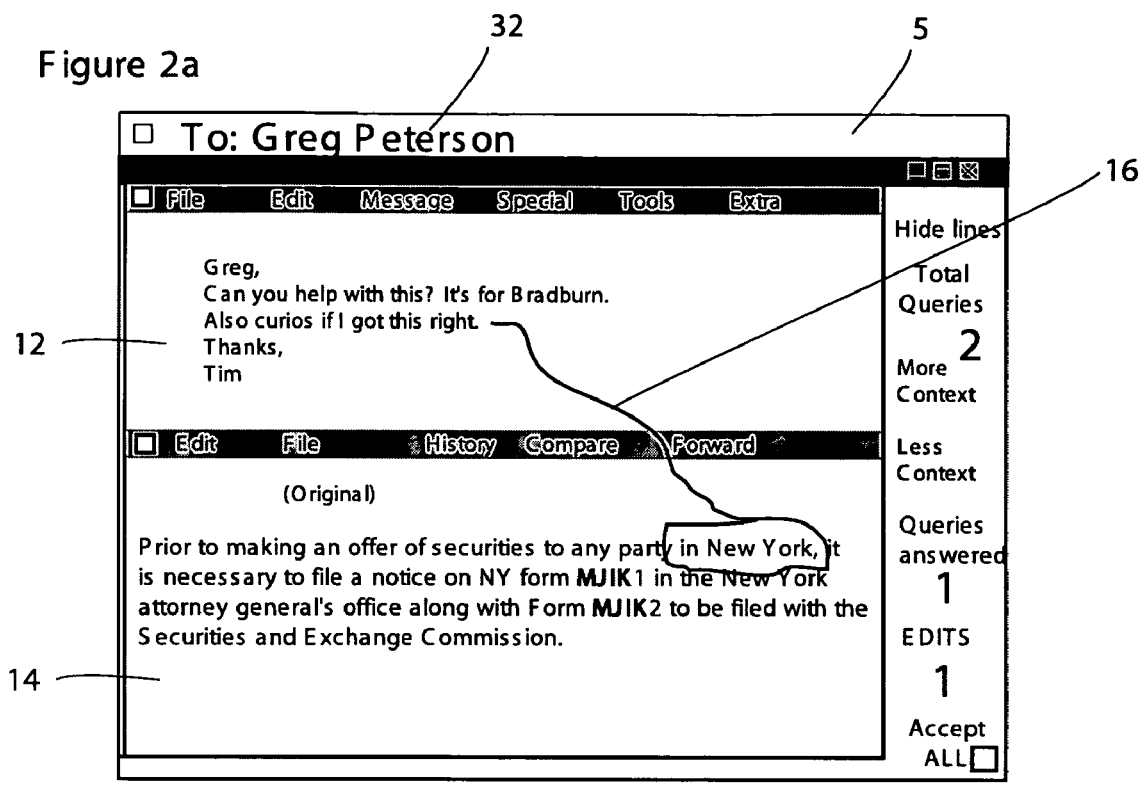
FIG. 2a shows MJIK messaging window 5 with a query area, address area, and context area.

FIG. 2a shows MJIK messaging window 5 with a query area 12, address area 32 and context area 14. This figure shows the user/sender ("Tim Anderson") seeking assistance from recipient/addressee "Greg Peterson" about three pieces of information. Context area 14 contains data automatically extracted by the system as a consequence of the user entering the first MJIK variable. The user may increase or decrease the amount of context provided in the context area 14 with controls embedded (arbitrarily) at the right of message window 5. The user entered the letters "MJIK" because he did not know the number of the form appropriate for this context. In this embodiment when the user added a second variable, (not knowing the name of an auxiliary form) the first became "MJIK1" and the second became "MJIK2. In query area 12 the user is able to focus or direct the inquiry if necessary (note that in many cases, as demonstrated here, the context alone is sufficient, due to the inclusion of the MJIK variable, to elicit a response from the recipient (Here, Greg). The third piece of information is identified by connection element 16, a line drawn with the cursor control device that crosses the boundary of message areas (12 and 14).

Note that the system removes extraneous information automatically. For example, the sender does not need to know who is sending the message. The recipient does not need to see text indicating who the recipient is. Of course, if such information is needed, the headers can be expanded to display this information. The result is a visual simplification and increased focus on the data that is valuable.

Figure 2B:
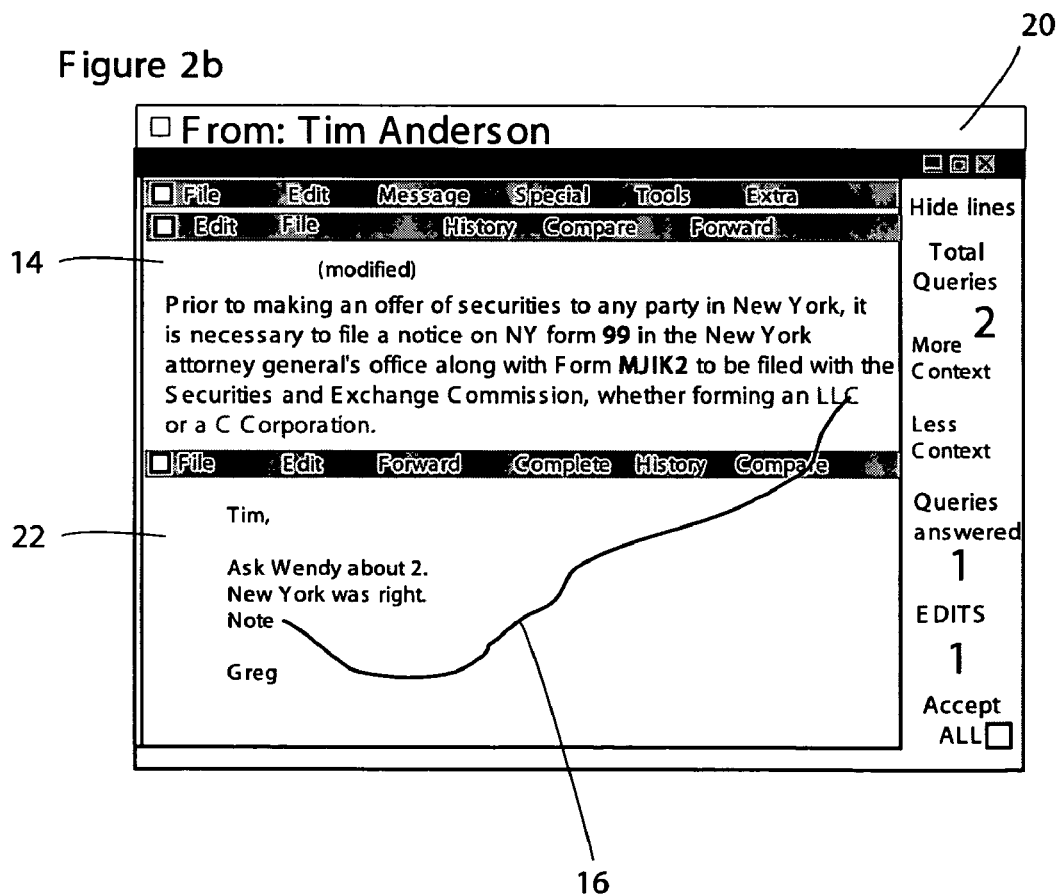
FIG. 2b shows a MJIK response message window.

FIG. 2b shows a MJIK response message window 20. The original query area 12 (of FIG. 2a) has been reduced in size to only the control bar. (The text of query area 12 is again viewable by "double clicking" to expand the bar.) Context area 14 is now dominant, located above the response area 22. Context area 14 shows the edits made by the recipient highlighted. In this case, the recipient did not know the answer to MJIK2 and has recommended another source (Wendy) for the information. Alternately, the recipient may double-click on MJIK2, opening a status window. The recipient may then readdress the message and send it to Wendy directly. Opening a MJIK window within a MJIK window refers to original document, so the response from Wendy will return to the original addressee, in this example, Tim. When Tim receives response message window 20, he may then edit the information in the context area 14 (either as a function of the additional text in response area 22, or otherwise (as in the addition, "LLC or a C Corporation.") Poor writing may be corrected. New thoughts may be added. If additional context is needed the user may expand the context. The software then extracts additional context data to precede, append, or "both" the context originally extracted when the MJIK window was created. When the original addressee has edited the context to his satisfaction, the resulting document is transposed with the original text in the original document, without requiring the user to locate the original document.

EXAMPLES

Example 1

You are writing a letter but do not know a zip code of the person you're writing to . . . Just type MJIK. The system will determine the zip code automatically from context.
You write:
David Levy
16 Blake St.
Cambridge, Mass.
MJIK
You hit return, and the system provides you with: 02140.

Example 2

You are writing a company report. You write:
Our competitor has been selling the SodPro 2000 since MJIK. The first known use of tools was in MJIK. According to Edith MJIK, our margins are up MJIK % since last year.
  You send the first MJIK message to a friend of yours who knows all about SodPro. She sees the context and she sends back the edited message three days later. ". . . our competitor with has been selling the SodPro 2000 since 1953." It sounds right to you and you accept the change. The system updates the file without you needing to find or open the document.
  You don't address the second MJIK message, so it goes to a default External database/Web search which replies with four possible answers to the "first known use of tools." You chose one from the source you think is most reliable.
  You address the third MJIK message to "Internal". It goes to the Company database, which replies, "Szhertty." Because she is the only Edith in accounting.
  The fourth MJIK message goes to Edith. She replies the next day, but she has no idea what the answer is. She suggests some alternate text: It needs editing because she is a horrible writer. You need more context to do the work . . . You click "More context." You edit the text in the response, then accept it. The system places the edited response into the document without you needing to find it, open it, locate the specific location or perform the cut and paste. (Note: an obvious alternative is to have the system open the document, in the program, at the appropriate location, but this should not be necessary. This suggests one of the incremental steps the software can have in its version development: Start by automatically opening documents at the correct location and introduce pass through updating over time.)

The result: instead of diverting the person from the task at hand (writing the report) the gathering of information occurs within the context of the desired result. So instead of re-finding and reopening the same document several times over the course of days (as the information comes in) the work is done linearly, in a single pass.

Three days later, the file reads:

Our competitor has been selling the SodPro 2000 since 1953 and the first known use of tools was in 4500 B.C. According to Edith Szhertty, VP of Sales, the 6453 year development cycle has opened the door for the DirtDigger XL to overtake consumer sales in Upper Wisconsin.

All the work was done under control of the author, but without the need to re-find the document, reopen it and then re-find the specific location for each change . . . four separate times.

Example 3

FIGS. 2a and 2b demonstrate some details of a preferred embodiment. FIG. 2a shows the initial MJIK message. Lines can be drawn to connect specific thoughts in query window (above) to specific phrases in context window (below). The organizational structure: menu bars only effect the text directly underneath it; the menu on the right side contains commands specific to the overall task at hand.

Also note extraneous data is minimized by default. (i.e. The sender does not need to know who is sending the message. The recipient does not need to know who it is being sent to. Of course, if the info is needed, the headers can be expanded.)

FIG. 2b shows the response. The original question is hidden. Edits are highlighted. Opening a MJIK window within a MJIK window refers to ORIGINAL document, so the message to Wendy can be instantly forwarded by double clicking "MJIK2." Greg can then implement the rest of the feedback in the original document by clicking "ACCEPT ALL."

Example 4

Note that with unified messaging, the original document can be modified while the writer is out of the office. This also suggests another powerful use of the technology: to send MJIK messages to oneself.

In this case, you are planning a party and you are working out the cost estimates (missing data: the number of chairs needed, what kind of drinks, etc.) and you are writing a letter to the facilities about how late the party will end. You have a long list of questions that have come up, some in a spread sheet, some in MS Word. You send yourself MJIK messages, so you can remind yourself of your questions during the meeting. (Note: you do not have to print out a list, or write them down.) Several hours later you are at the meeting and take out your Blackberry. You go down the list of the MJIK messages you sent yourself. Each unknown you entered at your desk shows up here. You ask the group a question. Input the answer as a response. Send. Send. Send. Done. Done. Done.

Your email list becomes an active "to do" list. As you collect information, wherever you are, you can respond to your own MJIK message and COMPLETE the task . . . not just take a note about it.

Example 5 (Next Next Generation)

Mary has asked Bob to fix the compressor. Mary wants to know when it will be done, so she sends MJIK email to Bob. Later that afternoon Mary needs an answer, but Bob has not responded. Mary redresses the message to the INTERNAL database. The system responds instantly, based on telephone calls Bob made. The return email says: "Lowd Compressors Co. were called, but can't come till Thursday. Bernd Compressors Inc. (555-3465) are scheduled for 4:00 today."

What is claimed is:

1. A text editing system comprising a software program disposed in an electronic format on a first computing device, said software program including:
    an electronic document generation module configured to allow a user to generate an electronic document, to receive from the user a predefined string of characters identifying a location of unknown information, and to enter into the electronic document a placeholder for the unknown information at the location specified by the user with the predefined string;
    an active messaging module configured to recognize the predefined string of characters as entered into the electronic document and, after recognizing in response to recognizing the predefined string of characters, to automatically open a messaging window on a display that permits the user to compose a message requesting the unknown information from one or more recipients.

2. The system of claim 1 wherein said message window includes:
    a context window, said context window to include a subset of said document proximate the location of said predefined string of characters.

3. The system of claim 2 wherein the active messaging module is further configured receive a response from a recipient and display the response to the user.

4. The system of claim 3 wherein the active messaging module is further configured to automatically integrate the response into the electronic document in response to receiving approval from the user.

5. The system of claim 3 wherein the active messaging module is further configured to permit the user to edit the response.

6. The system of claim 5 wherein the active messaging module is further configured to automatically integrate an edited response into the electronic document.

7. The system of claim 1 wherein the predefined string of characters comprises text typed the user into the electronic document.

8. A method of editing a text document, the method comprising:
    opening an electronic document with a document editing program;
    manually entering a predefined string of characters into an open text document, causing the document editing program to recognize the entered string of characters as a placeholder for missing information, and in response to recognizing the string of characters, to open a messaging window;
    generating in the messaging window a query regarding the missing information;

forwarding the query to one or more identified recipients;

saving the electronic document on a computing device;

receiving a response to the query; and updating the saved document to contain information contained within the response.

9. The method of claim 8 wherein the message window includes a portion of the electronic document surrounding the placeholder.

10. The method of claim 9 further comprising enabling the user to vary the portion of the electronic document that is included in the message window.

11. The method of claim 9 wherein the message further includes a messaging area in which the user can enter a message to one or more recipients.

12. The method of claim 8 wherein the one or more recipients includes a person.

13. The method of claim 8 wherein the predefined string of characters consists of a single character.

14. The method of claim 8 further comprising, after receiving the response, displaying the response to the user and enabling the user to approve the response before updating the saved document.

15. The method of claim 8 wherein, the predefined string of characters consists of a string of alphanumeric characters.

16. The method of claim 8 wherein automatically updating the saved document comprises replacing the placeholder with the information contained within the response.

17. The method of claim 16 wherein automatically updating the saved document further comprises replacing information proximate the placeholder.

18. The method of claim 8 wherein the predefined string of characters comprises typed text.

19. The method of claim 8 wherein the query is forwarded to a person, a web agent, a database, or a data mining engine.

20. The method of claim 8 wherein the identified recipients include the user.

* * * * *